May 18, 1965

T. A. ROGERS 3,183,979

VIBRATING PLOW

Filed Jan. 3, 1964

THELMER A. ROGERS
*INVENTOR.*

BY

May 18, 1965

T. A. ROGERS 3,183,979

VIBRATING PLOW

Filed Jan. 3, 1964

THELMER A. ROGERS
INVENTOR.

BY *C. W. Coffee*
*Atty.*

… … … …

United States Patent Office 3,183,979
Patented May 18, 1965

3,183,979
VIBRATING PLOW
Thelmer A. Rogers, P.O. Drawer 1589, Lubbock, Tex.
Filed Jan. 3, 1964, Ser. No. 335,483
5 Claims. (Cl. 172—40)

This invention relates to earth working equipment and more particularly to vibrating plows.

In the cultivation of land, it is recognized that the earth may be cultivated deeper with less power if the plow is vibrated. In the past, generally this vibration has been done in a direction aligned with the direction of draft. If the vibration was not done in the direction of draft, in general the direction of vibration was contained within a vertical plane which also contained the line of draft.

It is more beneficial to vibrate the plow in a horizontal direction normal to the line of draft. The mechanism I prefer to produce this vibration results in a slight oscillatory vibration, the oscillatory motion having its axis parallel to the direction of draft. This oscillatory motion is also desirable.

The horizontal vibratory motion normal to the direction of draft presents a problem in that usually the principal resilient element between the frame of the plow and the ground is the pneumatic tires which support the plow. I have provided a pivotal joint between the ground engaging wheels and the frame so that the frame is free to vibrate without undue stress and strain upon the tires and the linkage between the frame and the tires.

An object of this invention is to provide a vibrating plow.

Another object is to provide a plow having horizontal vibration normal to the direction of draft.

Another object is to provide an oscillatory vibration having its axis parallel to the direction of draft.

A further object is to provide for adjustment of the amount of oscillatory motion present.

A further object is to provide a vibratory plow with a pivotal linkage between the frame of the plow and the ground engaging wheels so as to prevent undue stress and strain upon the linkage between the wheels and frame.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale, in which.

Figure 1:
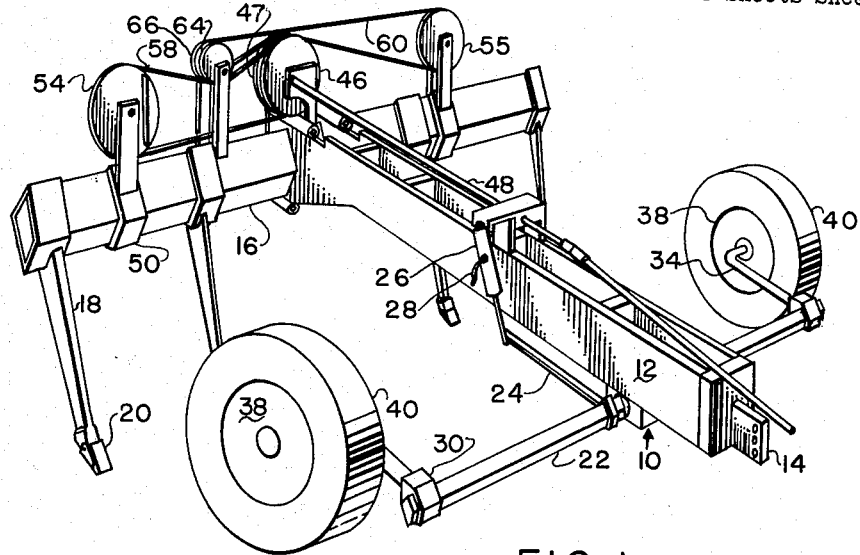
FIG. 1 is a perspective view of a plow according to this invention.
Figure 2:
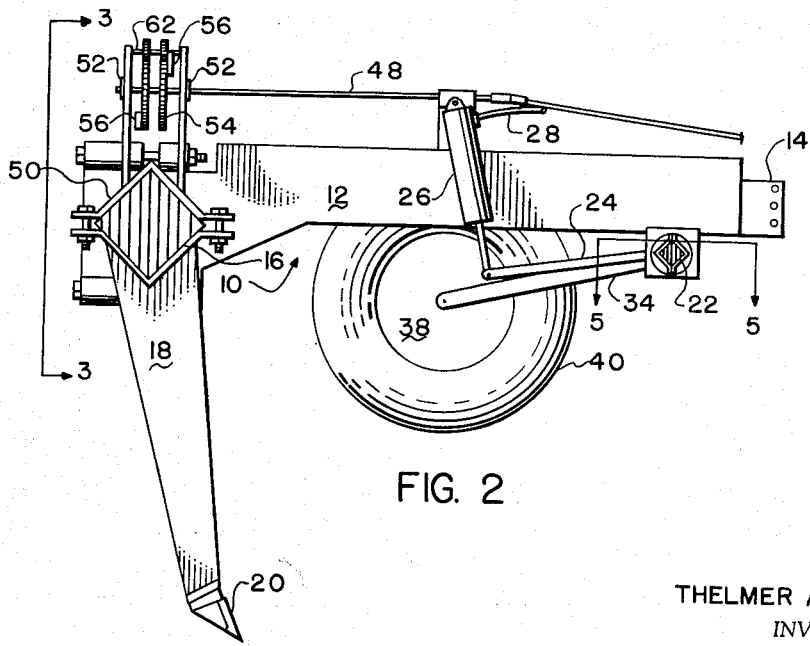
FIG. 2 is a sectional view of the plow taken on line 2—2 of FIG. 3.

Referring more specifically to the drawings, the plow includes frame 10. One principal element of the frame 10 is the tongue-like structure 12 extending from hitch 14 to tool bar 16. The tool bar 16 is horizontal and normal to the tongue-like structure 12. The hitch 14 provides means for attaching the plow to a draft vehicle (not shown).

The tool bar 16 has a plurality of shanks 18 depending therefrom. Each shank 18 has an earth working implement or plow point 20 on the bottom thereof. It will be noted that the shanks 18 are rigid and not spring shanks. The attachment of the shanks 18 to the tool bar 16 is by conventional and well known methods.

Shaft 22, having a square cross section, is journalled beneath the frame 10 forward and parallel to the tool bar 16. Crank 24 extends radially from the shaft 22. Hydraulic cylinder 26 is connected between the crank 24 and the frame 10 so that when the hydraulic pressure is fed to one side or the other through hydraulic hose 28 that the shaft 22 may be rotated in one or the other directions. Clamp 30 is attached to shaft 22. The clamp has two generally horizontal ears 32 attached to it and extending from it. Wheel arms 34 are attached within the ears and extend radially from the shaft 22. Each wheel arm 34 has a flattened lug 35 which fits between the ears 32 and through which pin 36 is placed. The top and bottom surfaces of the lug 35 acts with the interior surfaces of the ears 32 to form a bearing to keep the wheel arm 34 from rotating about its axis. Each lug 35 is secured and pivoted by pin 36 which extends through a hole in the ears 32 and a hole in the lug 35. Ground engaging gage wheels 38 are journalled on the end of the wheel arms 34. Each wheel carries a pneumatic tire 40. Two resilient helical springs 42 extend from each clamp 30 to plate 44 attached to the wheel arms 34 on either side of the pin 36. The stress within the springs 42 urge the wheel arms 34 in such a position so that the axis of each wheel 38 is parallel to the tool bar 16. Thus, I have provided a connection between the ground engaging wheels 38 and the frame 10 of the plow so that the frame may have a horizontal vibratory motion which is not transmitted to the ground engaging wheels. Also, it will be understood that as the element or shaft 22 is rotated it causes the frame 10 to be raised or lowered.

Forward power sprocket 46 and rear power sprocket 47 are on shaft 48 which is journalled for rotation to the frame 10 about an axis which is parallel to the direction of draft, which is aligned with the tongue-like structure. Shaft 48 extends along the tongue-like structure 12 and is adapted to be connected to the power take-off of the tractor which provides power to the plow. This shaft 48 contains suitable universal joints as is well known to the art. Two clamps 50 attach to the tool bar and each carries bearing 52 thereon. The right bearing 52 carries right weight sprocket 54. The left bearing 52 carries left weight sprocket 55. Each weight sprocket has an eccentric weight 56 attached thereto. The axes of rotation of the two weight sprockets 54 and 55 are parallel to the axis of rotation of the power sprocket 46. Right chain 58 is trained around the forward power sprocket 46 and the right weight sprocket 54. Left chain 60 is trained on top of the rear power sprocket 47 and around the left weight sprocket 55. Idler shaft 62 is mounted for rotation on the frame 10 an adjustable distance above the frame. Forward idler sprocket 64 rides against the top of the right chain 58. The left chain 60 is trained around rear idler sprocket 66. The idler sprockets 64 and 66 are securely attached to the idler shaft 62 so that the idler sprockets assist in rotating the chains 58 and 60.

The forward and rear power sprockets 46 and 47 are of the same diameter. The forward and rear idler sprockets 64 and 66 are the same diameter. The right and left weight sprockets 54 and 55 are of the same diameter. Therefore, it may be seen that the weight sprockets will rotate at the same speed in opposite directions. The two weights 56 are the same and at the same eccentricity. If the weight sprockets are timed so that the weight on the right sprocket 54 is at top dead center while the weight on the left sprocket 55 is at bottom dead center; the horizontal components of the movement of the weights will be the same speed and in the same direction. However, at all times the vertical component of motion of the weights will be of the same speed, but opposite direction. If the weight sprockets are quite close together, the vertical component of motion will tend to cancel out, leaving only the horizontal components of motion which will result in linear horizontal reciprocatory motion which is normal to the direction of draft. The distance that the right and left weight sprockets 54 and 55 from each other may be adjustable by moving the clamps 50 along the tool bar 16. As the clamps 50 are moved, it is necessary to add or remove links from the chains 58 and 60. When the sprockets 54 and 55 are quite wide apart, there will be oscillatory motion which tends to oscillate the plow about its tongue-like structure 12. Stated otherwise, it will tend to oscillate with the axis of oscillation being the line of draft.

Figure 3:
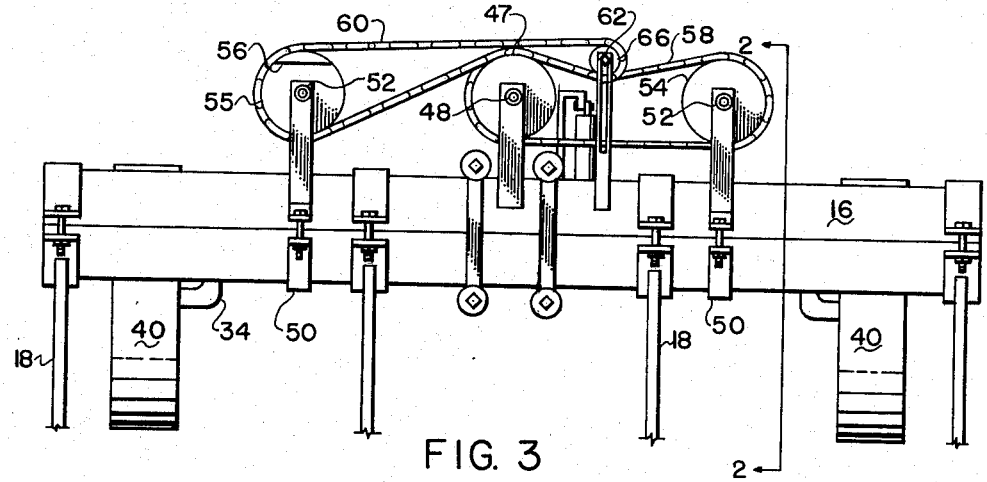
FIG. 3 is a rear view of the plow taken on line 3—3 of FIG. 2 with some parts broken away for clarity.
Figure 4:
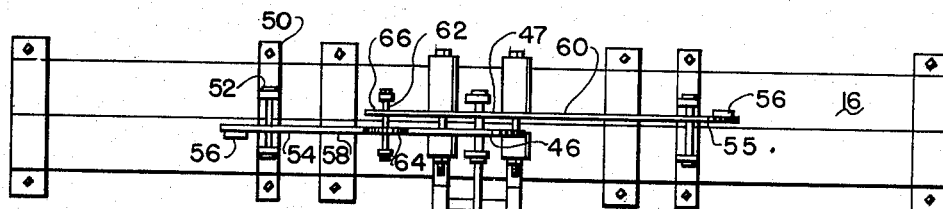
FIG. 4 is a top view of the plow.
Figure 4:
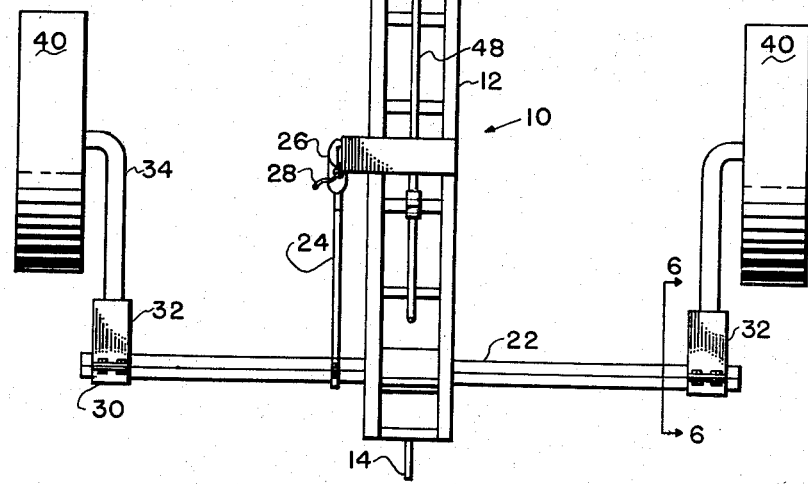
Figure 5:
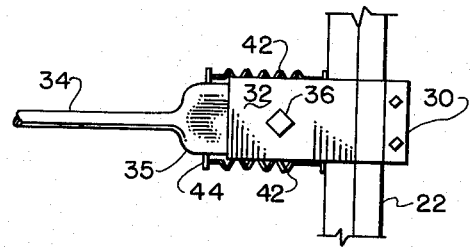
FIG. 5 is a sectional view taken on line 5—5 of FIG. 2 showing details of construction.
Figure 6:
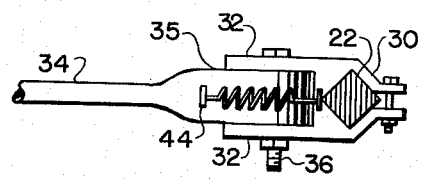
FIG. 6 is a sectional view taken on line 6—6 of FIG. 4.
Figure 7:
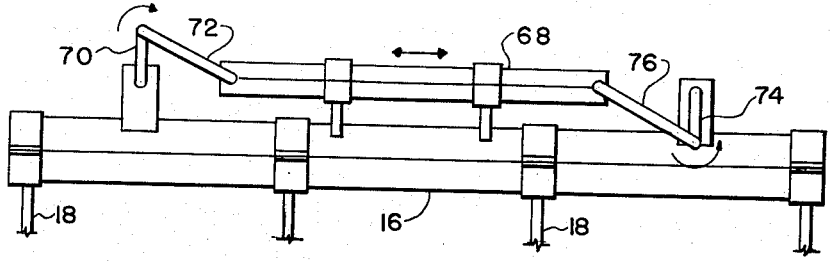
FIG. 7 is a schematic rear view of another embodiment showing a portion of this invention.

FIG. 7 illustrates a second embodiment illustrating that there are different ways in which horizontal linear vibration normal to the direction of draft may be obtained. It is substantially similar to FIG. 3 except for the showing of the different embodiment. I.e. it illustrates a tool bar 16 with a plurality of shanks 18 depending therefrom. Weights 68 is mounted for horizontal reciprocation normal to the direction of draft. Crank 70 is driven and connected by connecting rod 72 to the weight 68. A second crank 74 is attached to the tool bar on the other side of the weight 74 and it has a connecting rod 76. The second crank and connecting rod 74 and 76 are provided merely to provide a balancing weight to have the same vertical components of motion in the opposite direction as that of crank 70 and 72. Therefore, it may be seen that upon power rotation of crank 70 that there is produced primarily a horizontal reciprocating vibratory motion with a slight oscillating motion which has its axis coincident with the line of draft. Of course, the oscillatory motion present will depend upon the unbalanced weight of the cranks 70 and 74 and unbalanced portion of the weight of the connecting rods 72 and 76.

It will be apparent that the embodiments shown are only exemplary and that various modifications can be made in construction, materials, and arrangement within the scope of the invention as defined in the appended claims.

I claim as my invention:

1. In a plow having
(a) a frame,
(b) a hitch on the frame for attaching it to a draft vehicle,
(c) a tool bar attached to the frame,
(d) at least one shank depending from the tool bar, and
(e) ground engaging wheels on the frame;
  the improvement comprising:
(f) two weights mounted on the frame for periodic movement,
(g) gearing interconnecting said weights,
(h) the gearing causing the horizontal component of motion of one weight to be equal and in the same direction as the horizontal component of motion of the other weight, and
(j) the gearing causing the vertical component of motion of one weight to be equal and in the opposite direction as the vertical component of the other weight,
(k) means for driving said gearing to produce said periodic motion,
(m) arms interconnecting the wheels to the frame, and
(n) said arms mounted for horizontal movement so that the frame may vibrate horizontally with respect to the wheels.

2. In a plow having
(a) a frame,
(b) a hitch on the frame to attach it to a draft vehicle,
(c) a tool bar attached to the frame,
(d) at least one shank depending from the tool bar, and
(e) ground engaging wheels on the frame;
  the improvement comprising:
(f) two parallel shafts mounted on the frame,
(g) each shaft mounted for rotation,
(h) means on the frame for rotating the shafts at the same speed in opposite directions, and
(j) each shaft having an eccentric weight attached thereto,
(k) the distance between the shafts being adjustable.

3. The invention as defined in claim 2 wherein
(k) arms interconnect the wheels to the frame, and
(m) the arms are mounted for horizontal movement so that the frame may move horizontally with respect to the wheels.

4. In a plow having
(a) a frame,
(b) a hitch on the frame to attach it to a draft vehicle,
(c) a tool bar attached to the frame,
(d) at least one shank depending from the tool bar, and
(e) means on the frame for vibrating the frame and thus the shank,
  the improvement comprising:
(f) a shaft journalled to the frame,
(g) two wheel arms pivoted to the shaft about an axis transverse to the shaft,
(h) said arms extending radially from the shaft,
(j) a ground engaging wheel journalled to each arm, and
(k) means for rotating the shaft thus raising and lowering the frame,
(m) said means for vibrating producing a vibratory motion with a horizontal component in the frame normal to the direction of draft.

5. In a plow having
(a) a frame,
(b) a hitch on the frame to attach it to a draft vehicle,
(c) a horizontal tool bar attached to the frame,
(d) at least one shank depending from the tool bar, and
(e) said tool bar normal to the direction of draft;
  the improvement comprising:
(f) two clamps adjustably attached to the tool bar,
(g) a bearing in each clamp,
(h) a weight sprocket with an axis parallel to the direction of draft journalled in each bearing,
(j) an eccentric weight on each weight sprocket,
(k) a shaft journalled for rotation on said frame,
(l) means attached to the shaft for rotating the shaft, and (m) chains drivingly connected from said shaft to each of said weight sprockets.

References Cited by the Examiner

UNITED STATES PATENTS

| | | | |
|---|---|---|---|
| 1,225,853 | 5/17 | Pidgeon | 172—709 |
| 2,633,781 | 4/53 | Day. | |
| 2,704,021 | 3/55 | Brundage | 172—413 X |
| 2,725,799 | 12/55 | Day et al. | |
| 2,772,617 | 12/56 | Tangeman | 172—709 |
| 2,830,519 | 4/58 | Chandler et al. | 172—413 |
| 3,103,250 | 9/63 | Lamb | 172—40 |

FOREIGN PATENTS

| | | |
|---|---|---|
| 1,022,404 | 1/58 | Germany. |
| 519,046 | 3/40 | Great Britain. |
| 580,703 | 8/58 | Italy. |

T. GRAHAM CRAVER, *Primary Examiner.*